United States Patent
Hollis

(10) Patent No.: US 9,798,693 B2
(45) Date of Patent: *Oct. 24, 2017

(54) DATA BUS INVERSION (DBI) ENCODING BASED ON THE SPEED OF OPERATION

(71) Applicant: QUALCOMM Incorporated, San Diego, CA (US)

(72) Inventor: Timothy Mowry Hollis, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/362,385

(22) Filed: Nov. 28, 2016

(65) Prior Publication Data

US 2017/0075854 A1    Mar. 16, 2017

Related U.S. Application Data

(63) Continuation of application No. 14/202,783, filed on Mar. 10, 2014, now Pat. No. 9,529,749.

(60) Provisional application No. 61/791,865, filed on Mar. 15, 2013.

(51) Int. Cl.
  *G06F 13/20* (2006.01)
  *G06F 13/28* (2006.01)
  *G06F 13/42* (2006.01)
  *H04L 7/04* (2006.01)

(52) U.S. Cl.
  CPC ........ *G06F 13/4286* (2013.01); *G06F 13/287* (2013.01); *G06F 13/4221* (2013.01); *G06F 13/4226* (2013.01); *H04L 7/04* (2013.01); *Y02B 60/1228* (2013.01); *Y02B 60/1235* (2013.01)

(58) Field of Classification Search
  CPC .......................... G06F 13/287; G06F 13/4221
  See application file for complete search history.

(56) References Cited

U.S. PATENT DOCUMENTS

| 7,280,412 B2 | 10/2007 | Jang et al. |
| 7,522,073 B1 | 4/2009 | Kao |
| 7,616,133 B2 | 11/2009 | Hollis |
| 8,094,045 B2 | 1/2012 | Hollis |

(Continued)

FOREIGN PATENT DOCUMENTS

| CN | 101897119 A | 11/2010 |
| CN | 102142270 A | 8/2011 |

(Continued)

OTHER PUBLICATIONS

Hollis T.M., et al., "Data Bus Inversion in High-Speed Memory Applications," IEEE Transactions on Circuits and Systems—II: Express Briefs, Apr. 2009, Vol. 56 (4), pp. 300-304.

(Continued)

*Primary Examiner* — Glenn A Auve

(74) *Attorney, Agent, or Firm* — Austin Rapp & Hardman, P.C.

(57) ABSTRACT

A method for data transmission is described. A signaling speed of operation of an electronic device is determined. A data bus inversion algorithm is selected based on the signaling speed of operation. The selected data bus inversion algorithm is used to encode data. The encoded data and a data bus inversion flag are sent to a receiver over a transmission medium.

20 Claims, 8 Drawing Sheets

(56) References Cited

U.S. PATENT DOCUMENTS

| | | |
|---|---|---|
| 8,451,913 B2 | 5/2013 | Oh et al. |
| 8,510,490 B2 | 8/2013 | Abbasfar |
| 8,630,305 B2 | 1/2014 | Anderson et al. |
| 9,529,749 B2 * | 12/2016 | Hollis .................. G06F 13/287 |
| 2009/0193319 A1 | 7/2009 | Shen et al. |
| 2009/0228624 A1 | 9/2009 | Maldei et al. |
| 2011/0084737 A1 | 4/2011 | Oh et al. |
| 2011/0222623 A1 | 9/2011 | Hollis |
| 2013/0061006 A1 | 3/2013 | Hein |
| 2013/0159818 A1 | 6/2013 | O'Connor et al. |
| 2014/0281075 A1 | 9/2014 | Hollis |

FOREIGN PATENT DOCUMENTS

| | | | |
|---|---|---|---|
| JP | 2011525093 | A | 9/2011 |
| JP | 2012531092 | A | 12/2012 |
| KR | 20030075155 | A | 9/2003 |
| KR | 20050069789 | A | 7/2005 |
| WO | 2005122509 | A1 | 12/2005 |
| WO | 2008033830 | A2 | 3/2008 |
| WO | 2009091577 | A2 | 7/2009 |

OTHER PUBLICATIONS

International Search Report and Written Opinion—PCT/US2014/023508—ISA/EPO—dated Jun. 6, 2014.

\* cited by examiner

DATA BUS INVERSION (DBI) ENCODING BASED ON THE SPEED OF OPERATION

RELATED APPLICATION

This application is a continuation of U.S. Non-Provisional Patent Application Ser. No. 14/202,783, filed Mar. 10, 2014, which is related to and claims priority from U.S. Provisional Patent Application Ser. No. 61/791,865, filed Mar. 15, 2013, for "FREQUENCY-DEPENDENT BUS INVERSION ENCODING." The disclosures of both applications are hereby incorporated by reference.

TECHNICAL FIELD

The present disclosure relates generally to electronic communications. More specifically, the present disclosure relates to systems and methods for data bus inversion (DBI) encoding based on the speed of operation.

BACKGROUND

To increase signal and power integrity and reduce power consumption, data bus inversion (DBI) encoding may be employed. DBI encoding may be particularly useful for transferring large amounts of data quickly. For example, DBI encoding may be employed to facilitate high-speed data transfers between a central processing unit (CPU) and a dynamic random access memory (DRAM) device in a package-on-package (POP), a multi-chip package (MCP) or a variety of other memory interface configurations. DBI encoding may be particularly useful in mobile memory applications, such as Low Power Double Data Rate 4 (LPDDR4).

However, additional benefits may be realized by switching between different DBI encoding algorithms, based on the circumstances of the data. The different DBI encoding algorithms may provide a power reduction when used properly and a power penalty when used improperly. Benefits may be realized by selecting the DBI encoding algorithm based on signaling speed.

SUMMARY

A method for data transmission is described. A signaling speed of operation of an electronic device is determined. A data bus inversion algorithm is selected based on the signaling speed of operation. The selected data bus inversion algorithm is used to encode data. The encoded data and a data bus inversion flag are sent to a receiver over a transmission line.

The selected data bus inversion algorithm may be one of a DBI-AC algorithm and a DBI-DC algorithm. The selected data bus inversion algorithm may be DBI-AC when the signaling speed of operation is a low-speed mode. The selected data bus inversion algorithm may be DBI-DC when the signaling speed of operation is a high-speed mode. The signaling speed of operation may be communicated to an encoder by a dedicated signal. The dedicated signal may be provided through a command address bus or using an existing data line.

The signaling speed of operation may be autonomously determined by an encoder. The selected data bus inversion algorithm may be used to encode data using a topology that does not include feedback or using a topology that includes feedback. Data bus inversion algorithm encoding may be disabled autonomously based on a dynamic disable signal.

A termination control signal may be generated based on the selected data bus inversion algorithm. The termination control signal may be sent to the receiver. The method may be performed by a data bus inversion encoder that includes an algorithm selection multiplexer, an XOR gate that receives parallel unencoded data of an upcoming burst and parallel data of a previous burst, an inverter, a majority detection circuit and a true/complement multiplexer. The data bus inversion encoder may also include a frequency detection circuit. The selected data bus inversion algorithm may be based on a relationship between a physical layer clock frequency and a reference frequency.

An apparatus for data transmission is also described. The apparatus includes a processor, memory in electronic communication with the processor and instructions stored in the memory. The instructions are executable by the processor to determine a signaling speed of operation of an electronic device. The instructions are also executable by the processor to select a data bus inversion algorithm based on the signaling speed of operation. The instructions are further executable by the processor to use the selected data bus inversion algorithm to encode data. The instructions are also executable to send the encoded data and a data bus inversion flag to a receiver over a transmission line.

An electronic device is described. The electronic device includes means for determining a signaling speed of operation of the electronic device. The electronic device also includes means for selecting a data bus inversion algorithm based on the signaling speed of operation. The electronic device further includes means for using the selected data bus inversion algorithm to encode data. The electronic device also includes means for sending the encoded data and a data bus inversion flag to a receiver over a transmission line.

A computer-program product for data transmission is also described. The computer-program product includes a non-transitory computer-readable medium having instructions thereon. The instructions include code for causing an electronic device to determine a signaling speed of operation of the electronic device. The instructions also include code for causing the electronic device to select a data bus inversion algorithm based on the signaling speed of operation. The instructions further include code for causing the electronic device to use the selected data bus inversion algorithm to encode data. The instructions also include code for causing the electronic device to send the encoded data and a data bus inversion flag to a receiver over a transmission line.

DETAILED DESCRIPTION

Figure 1:
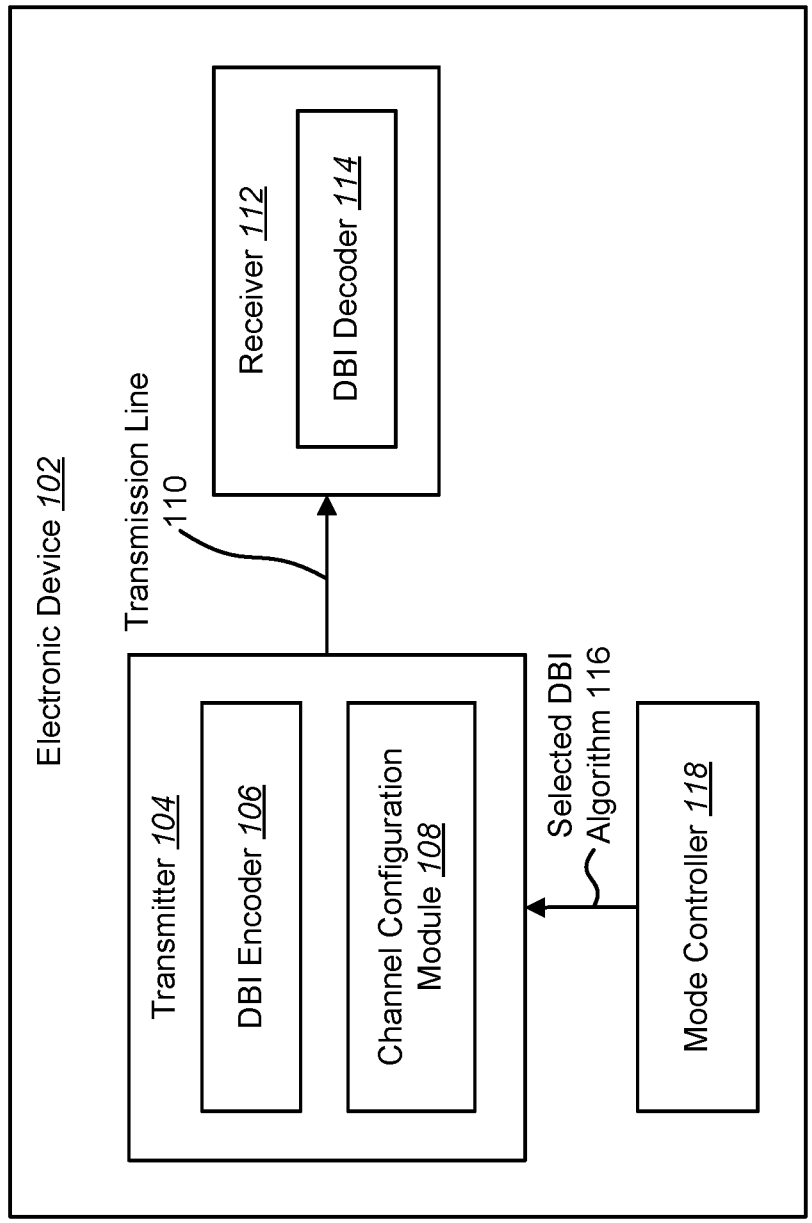
FIG. 1 is a block diagram illustrating data bus inversion (DBI) encoding/decoding circuitry.

FIG. 1 is a block diagram of an electronic device 102 for use in the present systems and methods. The electronic device 102 may be a base station, a wireless communication device, or other device that uses electricity. The electronic device 102 may include a transmission line 110 (also referred to as a transmission medium) used to transmit data between a transmitter 104 and a receiver 112. The transmitter 104 and the receiver 112 may also be located on different electronic devices (not shown). The data transmitted over the transmission line 110 may be encoded to reduce signaling power in the single-ended interface. For example, the data transmitted over the transmission line 110 may be encoded using data bus inversion (DBI) or bus-invert coding. DBI encoding is a technique where data bits may be inverted prior to transmission to maximize or minimize certain signaling characteristics. DBI encoding may include bit inversion encoding for any parallel interface, including commands, address information, etc. By adjusting the DBI algorithm used to encode data based on the speed of operation (e.g., the data rates used), benefits such as power savings or sufficient signal integrity may be achieved.

The transmitter 104 may include a DBI encoder 106. The DBI encoder 106 may encode data using a DBI algorithm. The encoded data may then be transmitted to the receiver 112 via the transmission line 110. The receiver 112 may use a DBI decoder 114 to decode the encoded data. In one configuration, the transmitter 104 and the receiver 112 may be located on a single chip. In another configuration, the transmitter 104 and the receiver 112 may each be located on different chips within an electronic device 102.

The electronic device 102 may include a mode controller 118. The mode controller 118 may be located on the same chip as the transmitter 104 and/or the receiver 112 or on a different chip. The mode controller 118 may instruct the transmitter 104 on which DBI algorithm 116 to use for encoding data on the transmission line 110. The mode controller 118 may communicate with a channel configuration module 108 on the transmitter 104. In one configuration, the channel configuration module 108 may receive instructions from the mode controller 118 to enable the proper encoding algorithm. In another configuration, the channel configuration module 108 may be capable of detecting the mode of operation and setting the proper encoding algorithm without external instruction from the mode controller 118. The channel configuration module 108 is discussed in additional detail below in relation to FIG. 4.

Figure 2:
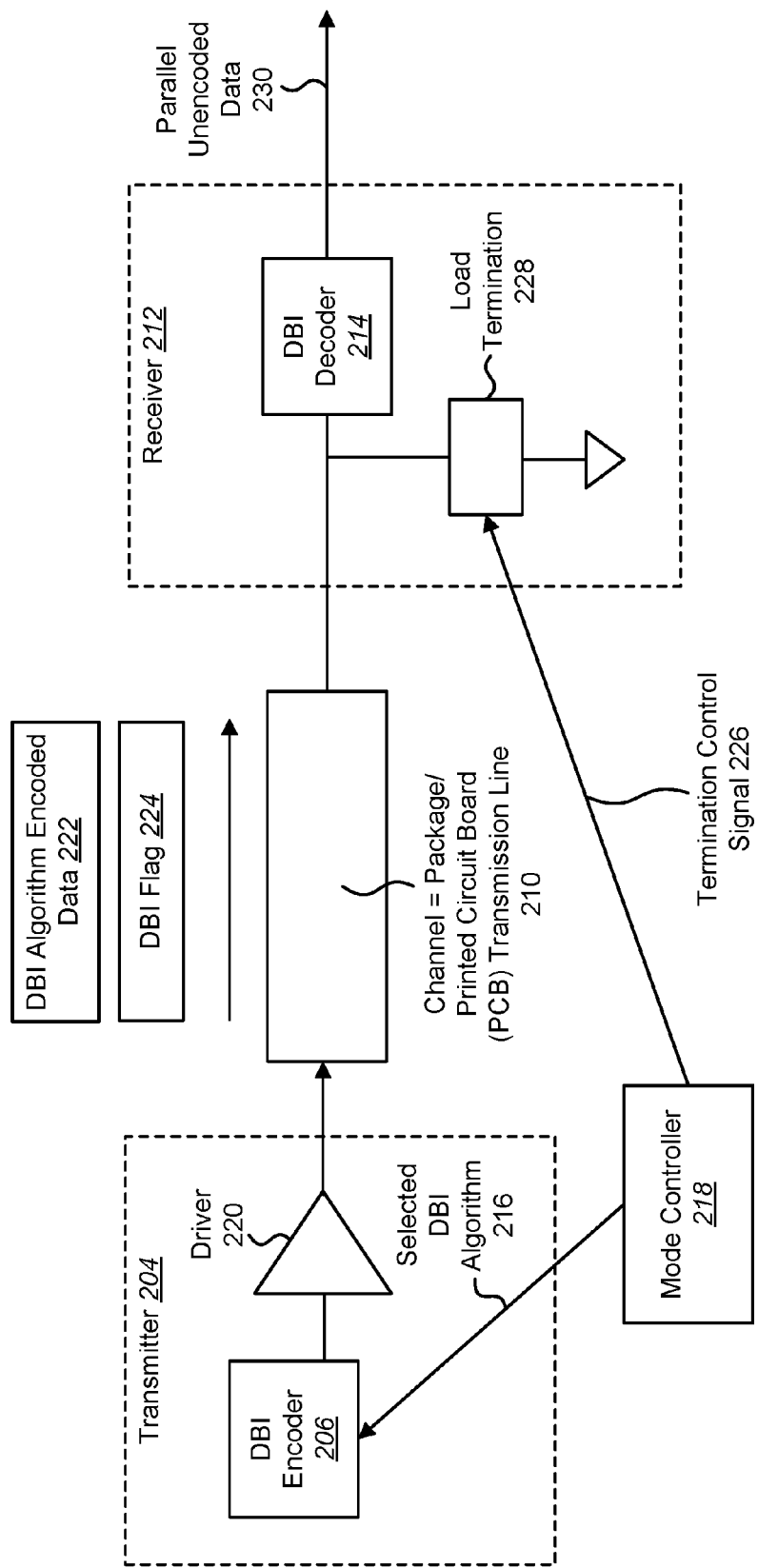
FIG. 2 is a block diagram illustrating data bus inversion (DBI) encoding/decoding.

FIG. 2 is a block diagram illustrating data bus inversion (DBI) encoding/decoding. As discussed above, DBI encoding is a technique wherein data bits may be inverted prior to transmission to maximize or minimize certain signaling characteristics. DBI encoding may include bit inversion encoding for any parallel interface, including commands, address information, etc. For example, DBI encoding may be used to invert data bits transferred between a transmitter 204 and a receiver 212. DBI encoding is often used to reduce power consumption and to improve signal and power integrity. In some configurations, the transmitter 204 and the receiver 212 may both be located on the same electronic device 102. The transmitter 204 may transfer large amounts of data to the receiver 212 over a small channel length (e.g., less than a few millimeters) or over longer lengths (e.g., several inches). The channel 210 may be a package/printed circuit board (PCB) transmission line 110. In one configuration, the channel may be a wireless channel 210. As an example, the channel 210 may be a coaxial cable, a silicon interposer trace or any other wireline interconnect technology.

The transmitter 204 may include a DBI encoder 206. The DBI encoder 206 may apply DBI encoding to signals transmitted from the transmitter 204 to the receiver 212. Examples of DBI encoding algorithms include DBI-AC and DBI-DC. DBI-AC is an algorithm designed to limit the number of simultaneously transitioning data bits across the width of the interface. DBI-DC is an algorithm designed to limit the number of simultaneous data bits at one of the two binary levels.

The choice of DBI algorithm 216 may depend on the signaling environment. It may be advantageous to have the ability to enable either a DBI-AC algorithm or a DBI-DC algorithm. If the improper DBI algorithm 216 is chosen, a performance penalty may occur. The DBI algorithm 216 may be selected by a mode controller 218 (also referred to as a core). The mode controller 218 may instruct the DBI encoder 206 on whether to use DBI-AC or DBI-DC as the selected DBI algorithm 216.

The mode controller 218 may also instruct the receiver 212 on whether to use an asymmetric load termination 228 (via a termination control signal 226). The asymmetric load termination 228 may be used by the receiver 212 to limit reflections on the transmission line 110. Applying DBI-DC to an asymmetrically-terminated channel may result in an 18% power reduction (assuming 1-DBI flag per byte). However, if an unterminated channel is used with DBI-DC, a 4% power penalty may occur. Conversely, applying DBI-AC to an unterminated channel may result in a 16% power reduction. However, if an asymmetrically-terminated channel is used with DBI-AC, a 4% power penalty may occur. Thus, in most cases, the termination control signal 226 may be coordinated with the DBI algorithm 216 used. There are configurations where the channel 210 is terminated through a symmetric connection to both the high and low voltage rails. In such instances, the DBI-AC algorithm may provide the best performance in terms of power and noise reduction.

In one configuration, the mode controller 218 may have the authority to override a channel configuration module 108 within the transmitter 204. For example, the mode controller 218 may have additional information such as knowledge that the link will be rapidly switching and it is preferred to not have to wait for the load termination 228 to enable/disable. The mode controller 218 may also know that the data pattern to be sent is not stressful from a signal integrity perspective, so that even though the data is being sent at a higher rate, the load termination 228 may not be needed (and thus the mode controller 218 may override termination decisions made by the channel configuration module 108).

It is important to note, however, that while there is a clear relationship between the DBI algorithm 216, the load termination 228 and the signaling power, there may still be configurations in which DBI-AC is used in conjunction with a terminated channel and configurations in which DBI-DC is used in conjunction with an unterminated channel. For example, if the signal integrity of a particular channel environment is dominated by crosstalk, then an encoding algorithm which limits the number of transitions may be a better choice, in spite of the corresponding power penalty.

The transmitter 204 may transmit DBI algorithm encoded data 222 and a DBI flag 224 over the channel 210 to the receiver 212 using a driver 220. The DBI flag 224 may be transmitted over the channel 210 in a variety of ways. For example, the DBI flag 224 may be driven between the transmitter 204 and receiver 212 using the same input/output circuitry as the other data bits. As another example, the DBI flags 224 corresponding to several sequential cycles may be accumulated and sent in parallel before or after the corresponding data burst, thereby not requiring any additional circuitry or substrate routing (only additional transmit cycles). The termination control signal 226 may also be transmitted to the receiver 212 via the channel 210. The receiver 212 may include a DBI decoder 214 that decodes the DBI algorithm encoded data 222 using the DBI flag 224. The DBI flag 224 may indicate the DBI algorithm 216 used for encoding (since the DBI algorithm 216 used may vary from burst to burst), but this is not always necessary. In order for the DBI flag 224 to indicate the DBI algorithm 216 being used, the transmitter 204 needs to send an additional one or two bits of information to the receiver 212 (either in parallel with the data burst, or before/after the burst during an additional transmit cycle).

The incoming encoded data may be provided to a true/complement multiplexer along with the complement values (i.e., the inverted parallel encoded data). The true/complement multiplexer may be controlled by the DBI flag 224, thereby de-inverting any inverted data. The decoding process may be independent of the encoding DBI algorithm 216, as long as the DBI flag 224 is consistent between the DBI algorithms 216 used. It may be advantageous for the polarity of the DBI flag 224 to differ between DBI algorithms 216. The DBI decoder 214 may output the parallel unencoded data 230.

One example where it may be advantageous to have the ability to enable either a DBI-AC algorithm or a DBI-DC algorithm is low power double data rate (LPDDR4) memory. In LPDDR4 memory, it is anticipated that there will be two primary modes of signaling operation: high-speed and low-speed. High-speed operation is expected to run at data rates above 3.2 gigabits per second (Gb/s). As a result, the chip-to-chip transmission line 110 may need to be terminated with a load matched to the channel characteristic impedance in order to guarantee sufficient signal integrity. In other words, in high-speed mode, the use of DBI-DC (with a terminated channel) may provide substantive benefits.

Low-speed operation is expected to run at data rates near 0.2 Gb/s. The lower speed allows for the disabling of the matched channel termination (i.e., with a non-terminated channel), which saves considerable power. As a result, the application of the DBI-AC algorithm in low-speed mode may provide substantive benefits.

The mode controller 218 may initiate a change in the transmitter 204 to receiver 212 operation (e.g., speed, termination). Therefore, the mode controller 218 may also communicate directly with the DBI encoder 206 to dynamically select the DBI algorithm 216. The mode controller 218 may also communicate with memory on the receiver 212 to enable/disable the load termination 228 by means of the command bus or some other signal (e.g., the termination control signal 226). Some receivers 212 may store the load termination 228 in memory while other receivers 212 will not include memory for storing the load termination 228.

Figure 3:
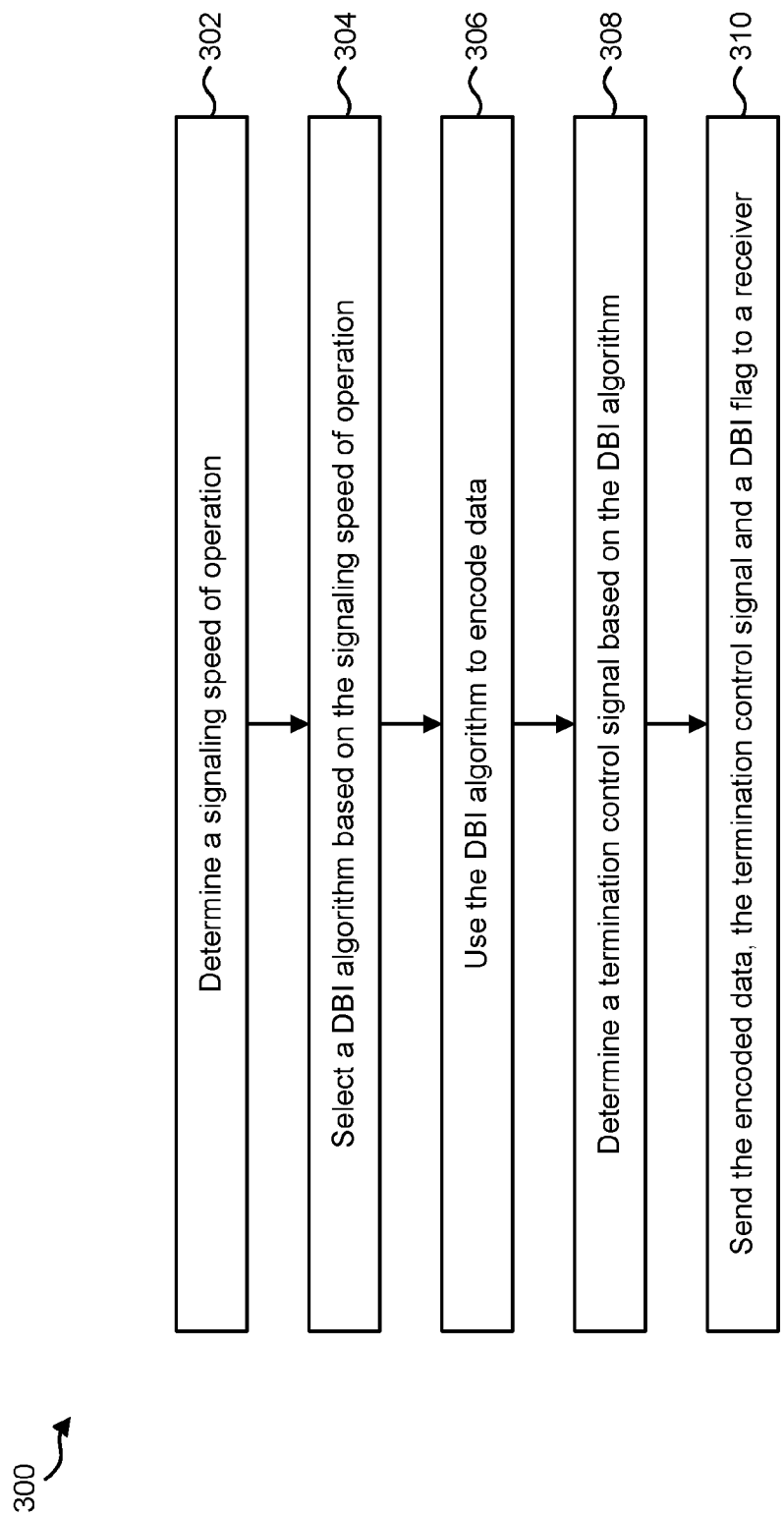
FIG. 3 is a flow diagram of a method for encoding data using a DBI algorithm that depends on the signaling speed of operation.

FIG. 3 is a flow diagram of a method 300 for encoding data using a DBI algorithm 116 that depends on the signaling speed of operation. The method 300 may be performed by an electronic device 102. In one configuration, the method 300 may be performed by a DBI encoder 106 on the electronic device 102 (e.g., within a transmitter 104 on the electronic device 102). The electronic device 102 may determine 302 a signaling speed of operation. For example, the electronic device 102 may determine whether the electronic device 102 is using a high-speed operation or a low-speed operation.

In one configuration, the signaling speed of operation may be communicated to the DBI encoder 106 by a dedicated signal. The dedicated signal may be provided via a command address bus or an existing data line. The DBI encoder 106 may also autonomously determine 302 the signaling speed of operation.

The electronic device 102 may select 304 a DBI algorithm 116 based on the signaling speed of operation. As an example, if the signaling speed of operation is high-speed, the electronic device 102 may select 304 DBI-DC as the DBI algorithm 116. If the signaling speed of operation is low-speed, the electronic device 102 may select 304 DBI-AC as the DBI algorithm 116. The electronic device 102 may use 306 the selected DBI algorithm 116 to encode data. The electronic device 102 may also determine 308 a termination control signal 226 based on the selected DBI algorithm 116. For example, the termination control signal 226 may indicate that a terminated channel is to be used if the DBI-DC algorithm is selected and an unterminated channel is to be used if the DBI-AC algorithm is selected. The electronic device 102 may send 310 the DBI algorithm encoded data 222, the termination control signal 226 and a DBI flag 224 to a receiver 212. As discussed above, the receiver 212 may be located on the same electronic device 102 or a different electronic device (not shown).

Figure 4:
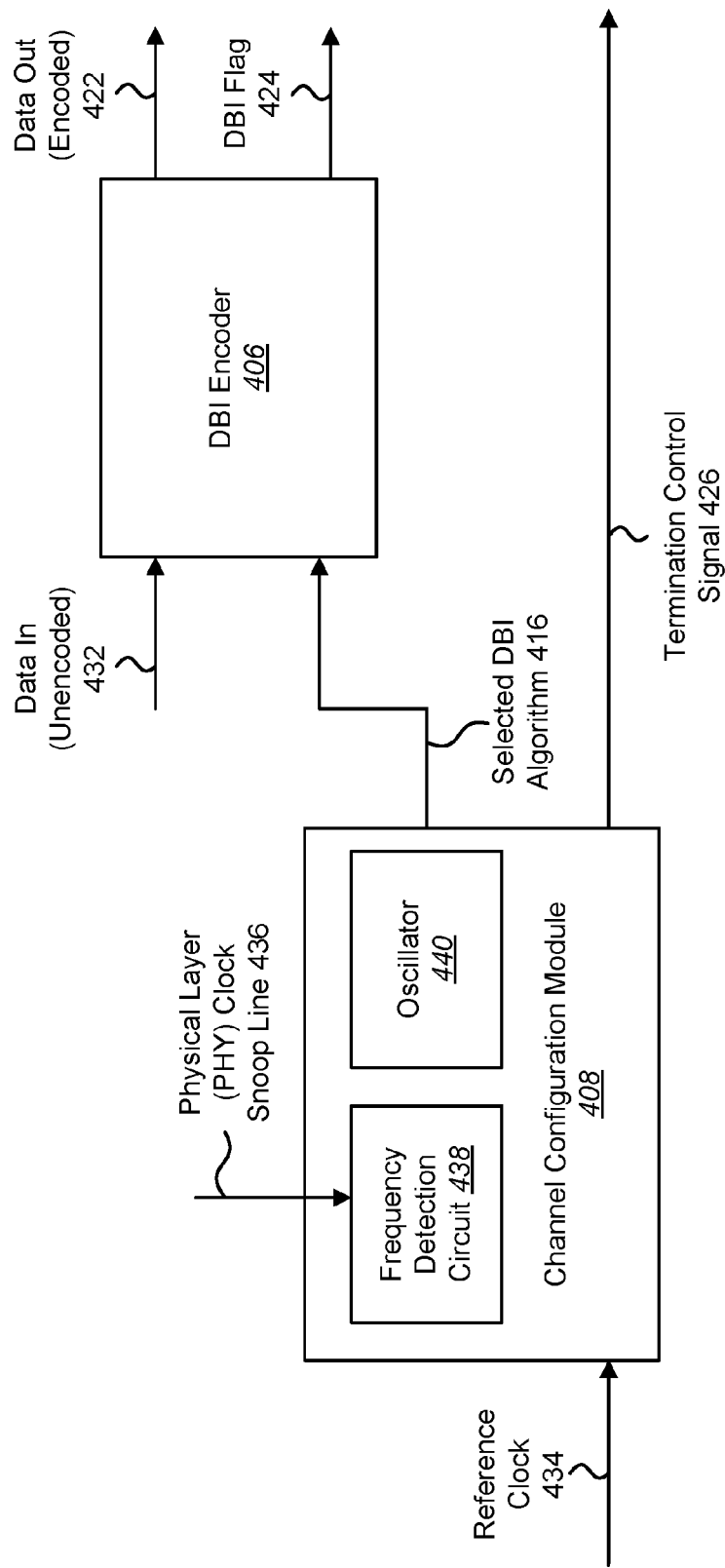
FIG. 4 is a block diagram illustrating high level DBI algorithm control.

FIG. 4 is a block diagram illustrating high level DBI algorithm control. A transmitter 104 (on an electronic device 102) may include a channel configuration module 408 and a DBI encoder 406. The channel configuration module 408 may receive instructions from the core (e.g., a mode controller 118). The instructions from the core may instruct the channel configuration module 408 on which DBI algorithm 416 to use and whether to enable/disable channel termination. The channel configuration module 408 may provide the selected DBI algorithm 416 to the DBI encoder 406. The DBI encoder 406 may receive data in 432 (unencoded). The DBI encoder 406 may output data out 422 (encoded) and a DBI flag 424 (in accordance with the selected DBI algorithm 416). The channel configuration module 408 may output the termination control signal 426.

The channel configuration module 408 may be capable of detecting the mode of operation based on the relative frequency of the physical layer (PHY) clock (which may be used to synchronize input/output (I/O) activity (typically a sub-harmonic of the I/O data rate)) and a reference clock frequency. The frequency of the reference clock 434 should be independent of the data rate or the PHY clock. The channel configuration module 408 may include a frequency detection circuit 438 that receives the PHY clock via a PHY clock snoop line 436. The frequency detection circuit 438 is discussed in additional detail below in relation to FIG. 7. The channel configuration module 408 may also receive a reference clock 434 signal for use in detecting the frequencies of the PHY clock.

In one configuration, the channel configuration module 408 may include an oscillator 440 with a known frequency of oscillation. The channel configuration module 408 may use the oscillator 440 to detect the mode of operation of the electronic device 102. The frequency of the oscillator 440 may be independent of the data rate of the PHY clock. For systems with a large difference between high and low speeds (e.g., an order of magnitude), the precision of the oscillator 440 and/or the frequency detection scheme may not need to be precise. In other systems, where multiple speeds of operation are permissible and/or where the step in speed between different operating modes is more gradual, the overall frequency detection scheme may benefit from increased precision.

The channel configuration module 408 may set the proper DBI encoding algorithm 416 to use and enable/disable channel termination (i.e., using the termination control signal 426) without external instructions to do so.

Figure 5:
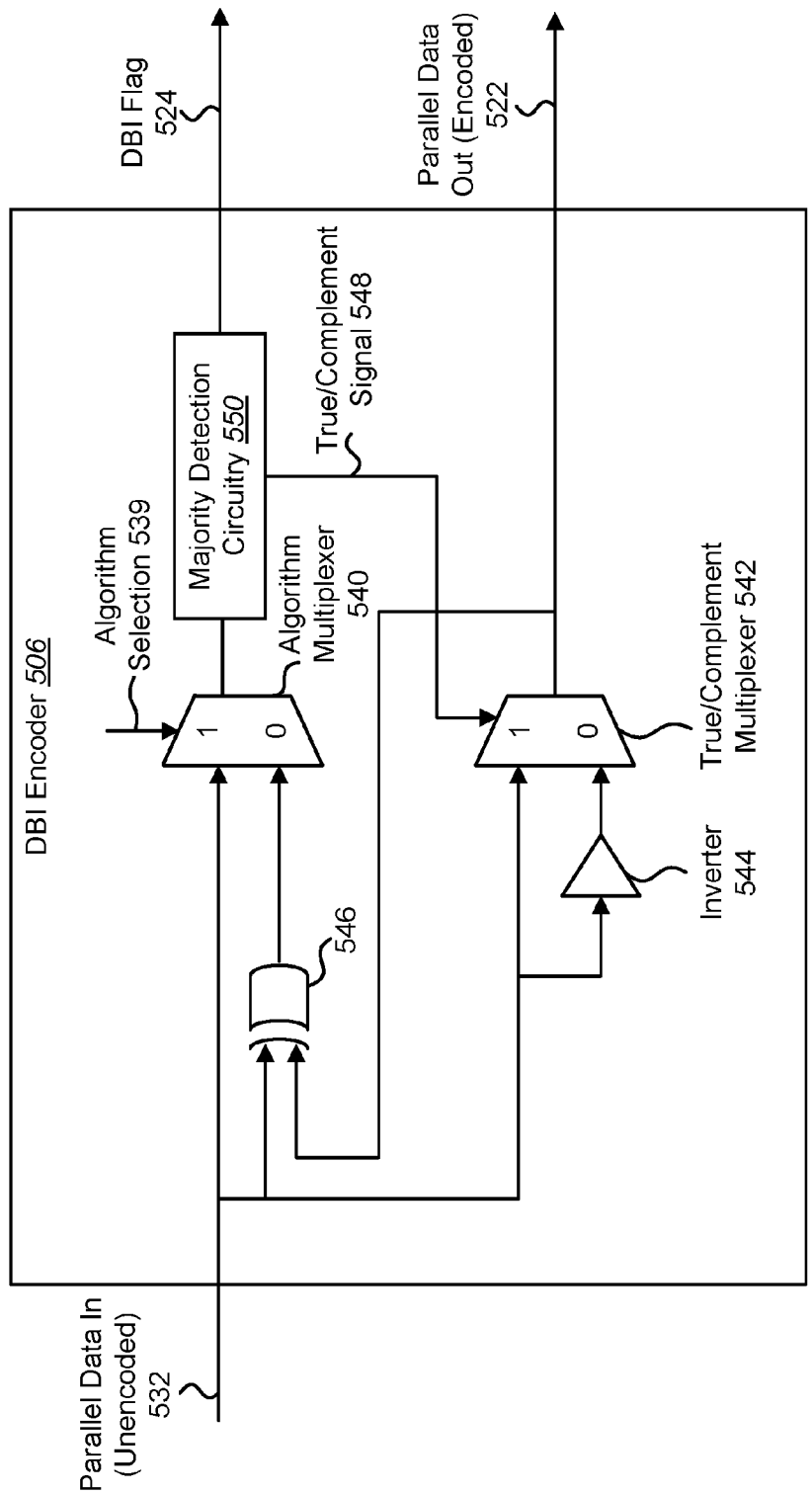
FIG. 5 is a block diagram illustrating one example of DBI selection circuitry in a DBI encoder.

FIG. 5 is a block diagram illustrating one example of DBI selection circuitry in a DBI encoder 506. The memory interface shown is unidirectional. However, many applications of the DBI encoder 506 may be bidirectional. The DBI encoder 506 of FIG. 5 may be one configuration of the DBI encoder 106 of FIG. 1. The DBI encoder 506 may receive parallel data in (unencoded) 532. The parallel data in (unencoded) 532 may be provided to a first input of an algorithm multiplexer 540. The algorithm multiplexer 540 may be controlled by an algorithm selection 539 signal that indicates to the DBI encoder 506 which DBI algorithm 116 to apply (e.g., based on the signaling speed mode). The parallel data out (encoded) 522 may be provided to an XOR gate 546 along with the parallel data in (unencoded) 532. The output of the XOR gate 546 may be provided to a second input of the algorithm multiplexer 540. The XOR gate 546 compares the incoming (next) cycle of parallel data with the feedback from the outgoing (last) cycle.

The output of the algorithm multiplexer 540 may be provided to majority detection circuitry 550. The majority detection circuitry 550 is designed to indicate an imbalance between the number of logical ones or zeros at the multiple inputs. During DBI-DC operation, the input values represent the number of ones or zeros to be transmitted during the next cycle. During DBI-AC operation, the input values (which come from the XOR gate 546 operation) indicate the number of expected transitions during the next cycle). For the case of DBI-AC, if more than half the parallel data bits will transition during the next cycle, the majority detection circuitry 550 may indicate to a true/complement multiplexer 542 (via a true/complement signal 548) to pass an inverted version of the parallel data in (unencoded) 532 (via an inverter 544). If less than half the parallel data bits will transition during the next cycle, the majority detection circuitry 550 may indicate to the true/complement multiplexer 542 (via the true/complement signal 548) to pass the parallel data in (unencoded) 532 without inverting (as the parallel data out (encoded) 522).

The majority detection circuitry 550 may also generate a DBI flag 524. In one configuration, the DBI flag 524 may be the same signal as the true/complement signal 548. The DBI flag 524 may be sent to an additional off-chip driver.

In memory interfaces, data is generally transmitted in bursts, where all of the data in a given burst generally comes from one memory bank (region). However, there is no constraint on the physical and temporal proximity of consecutive bursts. The bursts may come from different regions of the memory, with an unpredictable separation in time. It may thus be difficult or impossible for the memory device to analyze the number of transitions occurring between the end of one burst and the beginning of the next burst in order to implement DBI-AC with a no-feedback encoder.

For the case of DBI-AC, when the state of the data preceding the current cycle is unknown, it may be advantageous to temporarily disable the DBI encoder 506. This may be accomplished by disabling the DBI encoding at the end of each burst and then re-enabling the DBI encoding after (or as) the first edge of the new burst arrives at the DBI encoder 506. This behavior would be consistent and could be controlled using a finite state machine. A more compli-cated approach would be to additionally consider the source of the two consecutive bursts. If the two bursts come from the same bank, without an intermediate timing bubble, the DBI encoder 506 may still be able to calculate the valid transition data. Therefore, the DBI encoder 506 can remain enabled across the burst boundary. If the two bursts do not come from the same bank, or if there is an intermediate timing bubble, the DBI encoder 506 may be disabled after each burst and re-enabled in time for the second cycle of the subsequent burst.

In a third case, in between bursts, data may always be brought to a known value (e.g., all zeros). The DBI encoder 506 may then feed that known value to an XOR gate 546 as the preceding state of the bus at the beginning of each burst. For the case of LPDDR4, where the signals are explicitly referenced to ground and therefore naturally tend towards ground when not actively driven, the "preceding state" assumption may be clear and may thus not require additional circuitry to force the data state to a known value.

Figure 6:
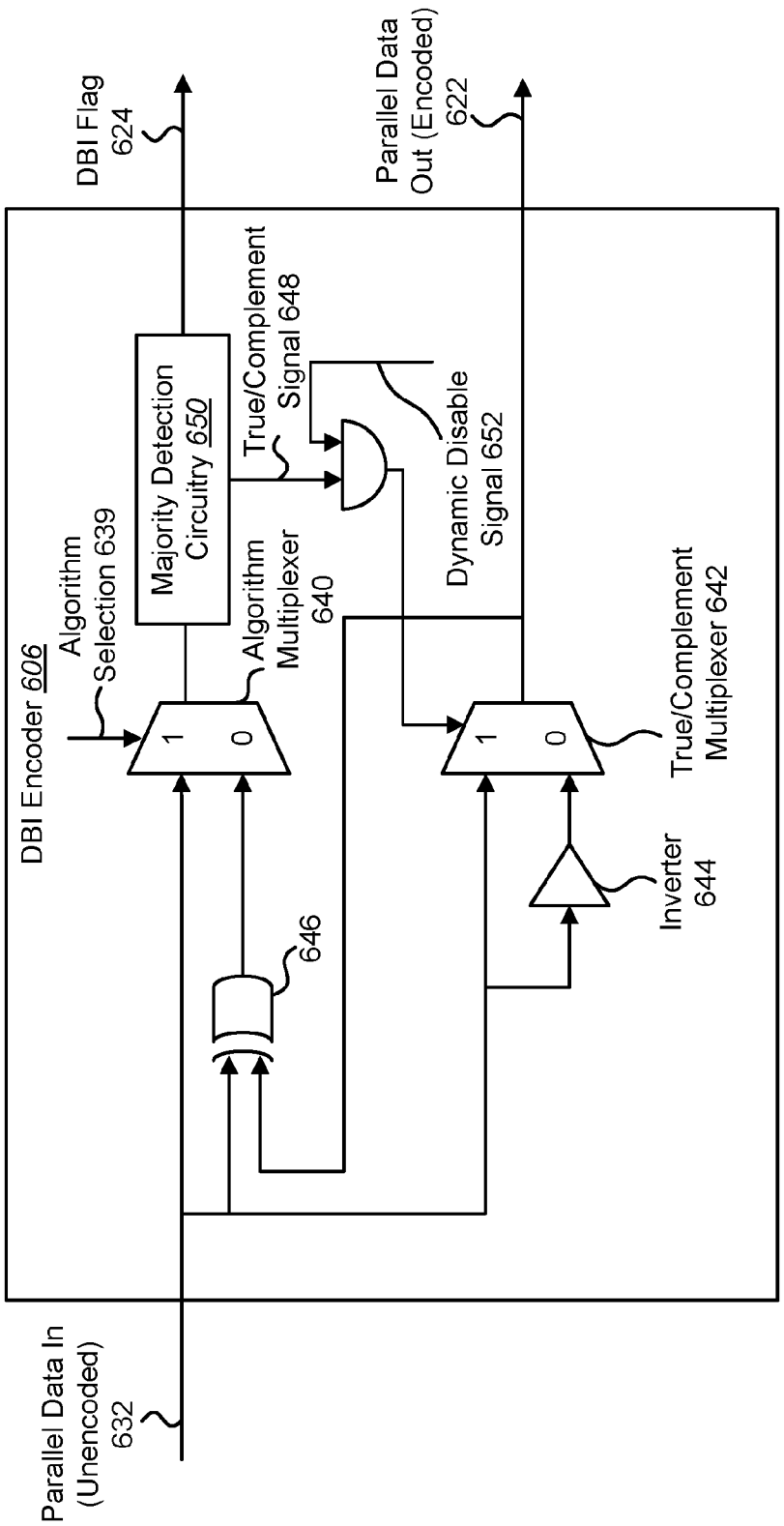
FIG. 6 is a block diagram illustrating another example of DBI selection circuitry in a DBI encoder.

FIG. 6 is a block diagram illustrating another example of DBI selection circuitry in a DBI encoder 606. The memory interface shown is unidirectional. However, many applications of the DBI encoder 606 may be bidirectional. The DBI encoder 606 of FIG. 6 may be one configuration of the DBI encoder 106 of FIG. 1. The DBI encoder 606 may receive parallel data in (unencoded) 632. The parallel data in (unencoded) 632 may be provided to a first input of an algorithm multiplexer 640. The algorithm multiplexer 640 may be controlled by an algorithm selection 639 that indicates to the DBI encoder 606 which DBI algorithm 116 to apply (e.g., based on the signaling speed mode). The parallel data out (encoded) 622 may be provided to an XOR gate 646 along with the parallel data in (unencoded) 632. The output of the XOR gate 646 may be provided to a second input of the algorithm multiplexer 640. The XOR gate 646 compares the incoming (next) cycle of parallel data with the feedback from the outgoing (last) cycle.

In order to facilitate the application of DBI-AC, the output of the algorithm multiplexer 640 may be provided to majority detection circuitry 650. The majority detection circuitry 650 may determine whether more than half of the parallel data bits will transition during the next cycle. If more than half the parallel data bits will transition during the next cycle, the majority detection circuitry 650 may output a true/complement signal 648 that is a digital logic 1. If less than half the parallel data bits will transition during the next cycle, the majority detection circuitry 650 may output a true/complement signal 648 that is a digital logic 0. The true/complement signal 648 and a dynamic disable signal 652 may be provided as inputs to an AND gate. The output of the AND gate may control a true/complement multiplexer 642. One input of the true/complement multiplexer 642 may be the parallel data in (unencoded) 632. A second input of the true/complement multiplexer 642 may be the parallel data in (unencoded) 632 passed through an inverter 644. Thus, whenever the dynamic disable signal 652 is a digital logic of zero, the DBI encoder 606 will output unencoded data, regardless of the DBI calculation. The dynamic disable signal 652 may also be applied in an encoder with a topology that does not use feedback.

The majority detection circuitry 650 may also generate a DBI flag 624. In one configuration, the DBI flag 624 may be the same signal as the true/complement signal 648. The DBI flag 624 may be sent to an additional off-chip driver. In another configuration, the DBI flag 624 may be sent without an additional off-chip driver, by sending the DBI flag 624 during a transmit cycle either preceding or following the data burst.

Figure 7:
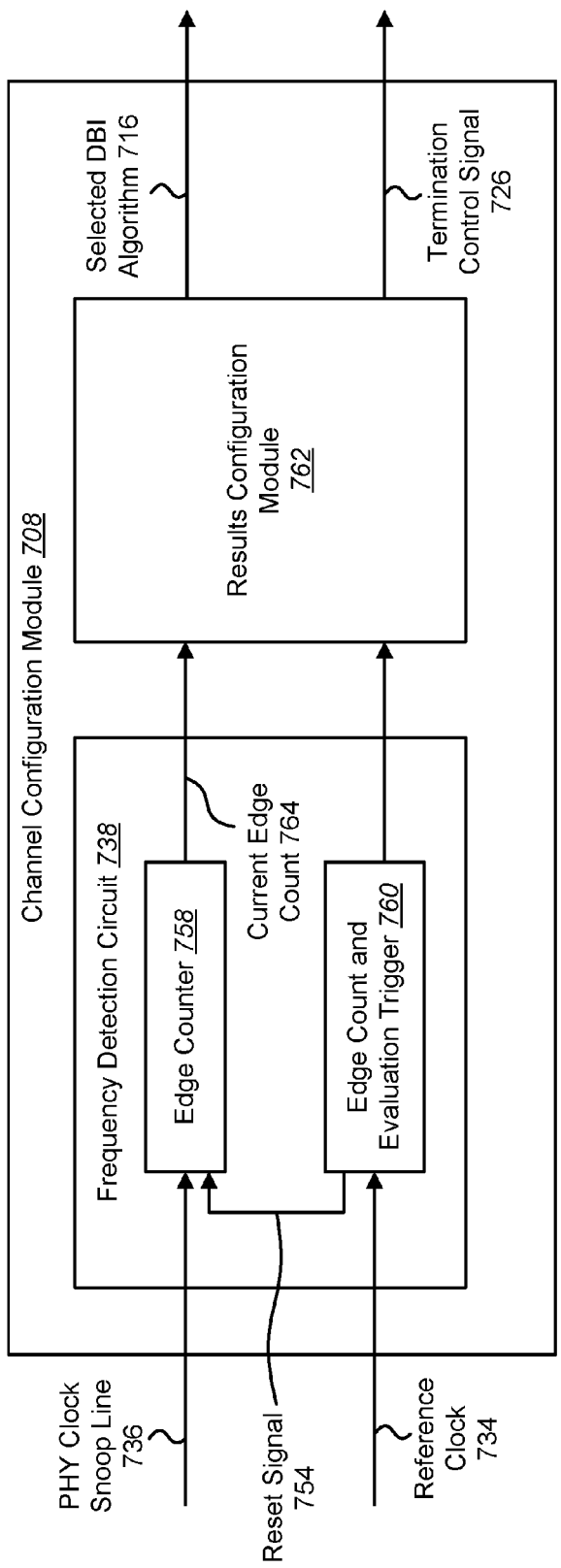
FIG. 7 is a block diagram illustrating a channel configuration module that includes a frequency detection circuit.

FIG. 7 is a block diagram illustrating a channel configuration module 708 that includes a frequency detection circuit 738. The frequency detection circuit 738 of FIG. 7 may be one configuration of the frequency detection circuit 438 of FIG. 4. The frequency detection circuit 738 may include an edge counter 758 and an edge count and evaluation trigger 760. The edge counter 758 may receive the PHY clock from the PHY clock snoop line 736. The edge counter 758 may count the edges of the PHY clock. Periodically, the edge count and evaluation trigger 760 may evaluate the edge count and reset the edge counter 758 (using a reset signal 754). The edge count and evaluation trigger 760 may receive a reference clock 734. When triggered to reset the edge counter 758, the current edge count 764 is provided to a results configuration module 762. The results configuration module 762 may compare the edge count 764 with a predetermined threshold (e.g., using a lookup table or a register) to see if a frequency threshold has been crossed. More edges counted may indicate a higher speed of operation. The results configuration module 762 may then select the appropriate DBI encoding algorithm 716 and termination control signal 726 based on the determined frequency of operation.

Figure 8:
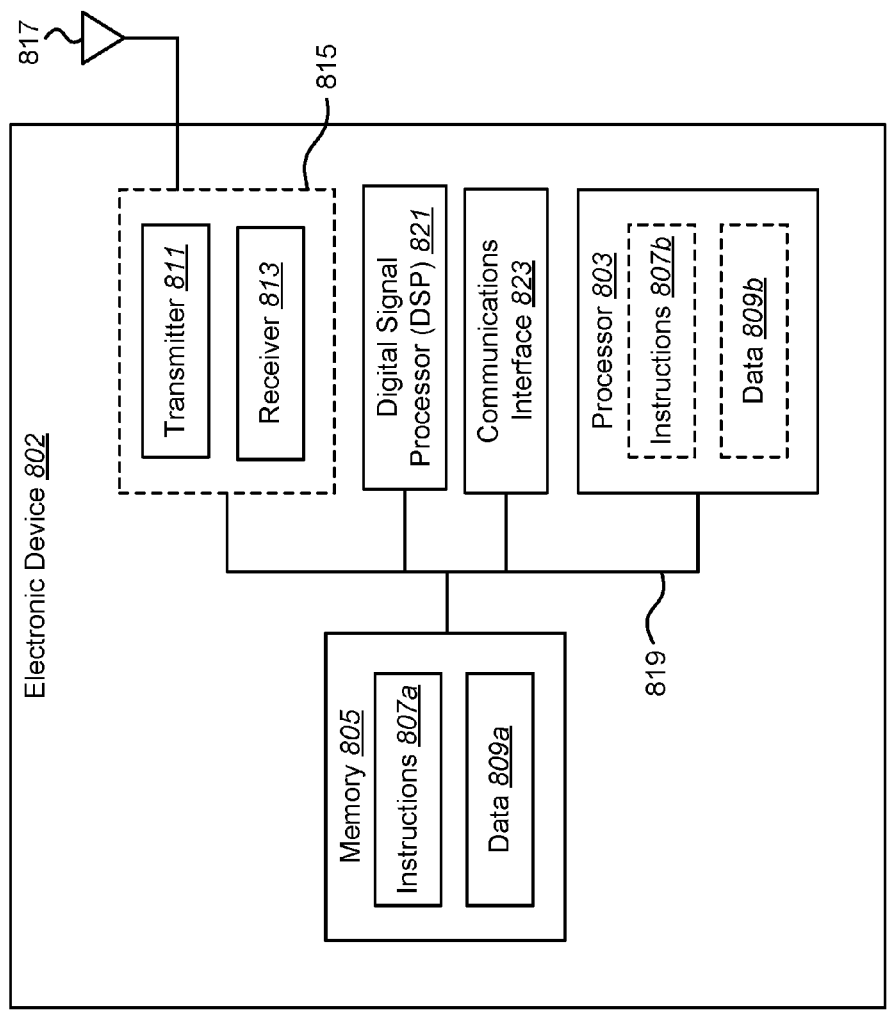
FIG. 8 shows part of a hardware implementation of an electronic device that uses speed-dependent data bus inversion (DBI) encoding.

FIG. 8 illustrates certain components that may be included within an electronic device 802 that uses frequency-dependent data bus inversion (DBI) encoding. The electronic device 802 may be an access terminal, a mobile station, a wireless communication device, a user equipment (UE), a base station, a Node B, a handheld electronic device, etc. The electronic device 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the electronic device 802 of FIG. 8, in an alternative configuration, a combination of processors 803 (e.g., an ARM and DSP) could be used.

The electronic device 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 809*a* and instructions 807*a* may be stored in the memory 805. The instructions 807*a* may be executable by the processor 803 to implement the methods disclosed herein. Executing the instructions 807*a* may involve the use of the data 809*a* that is stored in the memory 805. When the processor 803 executes the instructions 807*a*, various portions of the instructions 807*b* may be loaded onto the processor 803, and various pieces of data 809*b* may be loaded onto the processor 803.

The electronic device 802 may also include a transmitter 811 and a receiver 813 to allow transmission and reception of signals to and from the electronic device 802. The transmitter 811 and receiver 813 may be collectively referred to as a transceiver 815. An antenna 817 may be electrically coupled to the transceiver 815. The electronic device 802 may also include (not shown) multiple transmitters, multiple receivers, multiple transceivers and/or multiple antennas.

The electronic device 802 may include a digital signal processor (DSP) 821. The electronic device 802 may also include a communications interface 823. The communications interface 823 may allow a user to interact with the electronic device 802.

The various components of the electronic device 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus for data transmission, comprising:
   a mode controller configured to determine whether a signaling speed of operation of an electronic device is a high-speed mode or a low-speed mode and to select a data bus inversion algorithm based on whether the signaling speed of operation is the high-speed mode or the low-speed mode; and
   a transmitter configured to use the selected data bus inversion algorithm to encode data and to send the encoded data and a data bus inversion flag to a receiver over a transmission line.

2. The apparatus of claim 1, wherein the selected data bus inversion algorithm is one of a DBI-AC algorithm and a DBI-DC algorithm.

3. The apparatus of claim 2, wherein the selected data bus inversion algorithm is DBI-AC when the signaling speed of operation is the low-speed mode.

4. The apparatus of claim 2, wherein the selected data bus inversion algorithm is DBI-DC when the signaling speed of operation is the high-speed mode.

5. The apparatus of claim 1, wherein the signaling speed of operation is communicated to an encoder by a dedicated signal.

6. The apparatus of claim 5, wherein the dedicated signal is provided through a command address bus.

7. The apparatus of claim 5, wherein the dedicated signal is provided using an existing data line.

8. The apparatus of claim 1, wherein the signaling speed of operation is autonomously determined by an encoder.

9. The apparatus of claim 1, wherein the selected data bus inversion algorithm is used to encode data using a topology that does not comprise feedback.

10. The apparatus of claim 1, wherein the selected data bus inversion algorithm is used to encode data using a topology that comprises feedback.

11. The apparatus of claim 1, wherein data bus inversion algorithm encoding is disabled autonomously based on a dynamic disable signal.

12. The apparatus of claim 1, wherein the transmitter is further configured to generate a termination control signal based on the selected data bus inversion algorithm, and to send the termination control signal to the receiver.

13. The apparatus of claim 1, further comprising a data bus inversion encoder comprising:
   an algorithm selection multiplexer;
   an XOR gate that receives parallel unencoded data of an upcoming burst and parallel data of a previous burst;
   an inverter;
   a majority detection circuit; and
   a true/complement multiplexer.

14. The apparatus of claim 13, wherein the data bus inversion encoder further comprises a frequency detection circuit, and wherein the selected data bus inversion algorithm is based on a relationship between a physical layer clock frequency and a reference frequency.

15. An apparatus for data communication, comprising:
   a transmitter comprising a channel configuration module and a data bus inversion encoder, wherein:
   the channel configuration module is configured to determine whether a signaling speed of operation of an electronic device is a high-speed mode or a low-speed mode and to select a data bus inversion algorithm based on whether the signaling speed of operation is the high-speed mode or the low-speed mode, the data bus inversion encoder is configured to use the selected data bus inversion algorithm to encode data, and the transmitter is configured to send the encoded data and a data bus inversion flag to a receiver over a transmission line.

16. The apparatus of claim 15, wherein the selected data bus inversion algorithm is one of a DBI-AC algorithm and a DBI-DC algorithm.

17. The apparatus of claim 16, wherein the selected data bus inversion algorithm is DBI-AC when the signaling speed of operation is the low-speed mode.

18. The apparatus of claim 16, wherein the selected data bus inversion algorithm is DBI-DC when the signaling speed of operation is the high-speed mode.

19. The apparatus of claim 15, wherein the selected data bus inversion algorithm is used to encode data using a topology that does not comprise feedback.

20. The apparatus of claim 15, wherein the selected data bus inversion algorithm is used to encode data using a topology that comprises feedback.

* * * * *